United States Patent Office
2,887,116
Patented May 19, 1959

2,887,116

TREATMENT OF KERATINOUS MATERIAL

William M. Wooding, Springdale, Conn., assignor to American Cyanamid Company, New York, N.Y., a corporation of Maine No Drawing. Application October 20, 1955
Serial No. 541,821

10 Claims. (Cl. 132—73)

The present invention relates to a cosmetic process wherein solid smooth keratinous material such as horns, hooves, fingernails and toenails are given a lustrous finish. More particularly, the present invention relates to a process for improving the durability of lustrous finishes applied to such keratinous surfaces by pretreating the keratinous material with a small amount of an organic nitrogenous polymer.

It has long been and still is common cosmetic practice to apply lustrous finishes to solid smooth keratinous material including the horns and hooves of circus animals and the finger- and toe-nails of human subjects. For a white or colored finish a pigmented, high-opacity, quick-drying lacquer is generally employed, while a transparent (unpigmented) lacquer is generally used when a colorless or transparent effect is desired. In other instances waxes are employed. In any event the keratinous material is coated with a smooth, lustrous, hydrophobic organic film.

The films applied in this manner chip or flake in service quite rapidly, exposing areas of underlying dull contrasting keratinous surface to view. In the case of human fingernails coated with red lacquer film this constitutes a glaring fault. Repair by retouching the chipped areas is possible in cases where the results are not subject to close inspection such as circus animals as retouching leads to a non-homogeneous rough surface. In the case of human finger-nails retouching is of border-line acceptability, and at the present time, good practice requires that when the lacquer on a human finger-nail has begun to fail, all the old lacquer be removed by application of solvent and the entire nail be relacquered.

The present invention is based on the discovery that the durability of organic film material on smooth keratinous surfaces is improved when a small amount of water-dispersible organic nitrogen containing polymer is first applied directly over the keratinous material as an anchoring agent. The amount of polymer applied need be little more than a trace, and the evidence is that it is sufficient only to satisfy the adsorptive capacity of the outer part of the keratinous material for the polymer. The polymer may be applied in dilute organic or aqueous medium, as preferred.

In other words, the invention is based on a process wherein a dilute organic or aqueous dispersion of an organic nitrogen containing polymer is first applied to a keratinous surface, after which organic film-forming material is applied thereover. The principal effect of the nitrogenous polymer apparently is to modify the surface permitting the subsequently applied film material to anchor itself more firmly thereto. It should be understood that the amount of polymer present on the surface is insufficient to act as adhesive or cement on its own account.

The organic nitrogen containing polymer may be applied in any convenient way so long as the adsorptive capacity of the surface of the keratinous material therefore is substantially satisfied.

The polymer is most conveniently employed in the form of a dilute dispersion or solution containing less than 5% by weight of the resin, more concentrated dispersions (in the absence of a separate washing step), tending to form an undesirable polymeric film overlying the keratinous material causing inferior results. The contact time is quite brief and a few seconds to a minute is generally sufficient to saturate the surface even at the minimum practical resin concentration of about 0.01%. The resin adsorbed by the keratinous material is strongly held, and the surface may be flushed with water after treatment without detriment and at times with benefit as excess resin is usually not advantageous.

In practice we prefer to use dispersions containing between about 0.1% and 1% of polymer, as in this range the required contact time is so brief that sufficient amount can be applied without over-application by merely swabbing the keratinous material for a few seconds with absorbent cotton saturated with the polymer dispersion, or by dipping the keratinous material for a fraction of a minute therein.

The optimum polymer content of the dispersion depends principally on the particular polymer used, the duration of the contact, the viscosity of the dispersion, and the type of keratinous material treated. The optimum amount in each instance is thus most easily found by trial employing the information set forth in the examples as guides.

The applied fluid nitrogenous resin dispersion dries rapidly. Best results usually appear to follow when application of the organic film material is deferred until drying is complete. This is particularly true when the resins employed are of the thermosetting type which polymerize to a more strongly retained hydrophobic gel on drying.

The materials used to impart anchoring according to the present invention are hydrophilic nitrogen polymers. Typical suitable resins are obtained when basic nitrogenous substances are condensed with formaldehyde to form water-dispersible syrups in which the resin entities have ionic or electrostatic properties; cf. polymers Nos. 4 and 5 below. Suitable basic nitrogenous substances for this purpose are urea, melamine, dicyandiamide, guanidine, formoguanamine, biguanide, and guanylurea. If desired the anchoring properties may often be improved by incorporating a small amount of dimethylamine, ethylenediamine or preferably a polyalkylenepolyamine such as triethylenepentamine in the polymer; cf. polymers Nos. 2 and 7 below. Alternatively suitable resins may be made by co-reaction of one or more polyfunctional amines or ammonia with an alkylene polychloride to give a reticulated two or three dimensional non-thermosetting polymer; cf. polymer No. 9 below. Still further, polyazaalkanes may be used including polyethylenimine; cf. polymer No. 8 below. These polyazaalkanes have an average molecular weight in excess of 500, experience having shown such polyazaalkanes to have greater permanence than the lower molecular weight materials which may dissolve in the substrate or topcoat.

Further still, linear carbon chain polymers may be employed carrying ureido groups (cf. polymer No. 1 below) or quaternary ammonium groups (cf. polymers Nos. 6 and 10 below).

Still further, suitable polymers may be made by condensing a basic nitrogenous material with formaldehyde in the presence of material imparting anionic properties such as sulfur dioxide (polymer No. 3) or sodium sulfoxylate. Such polymers may also be made by reacting formaldehyde with a material such as β-aminopropionic acid or the half ester of sulfuric acid with 2-aminoethanol.

While very good results have been obtained by use of non-thermosetting polymers such as polymers Nos. 8, 9 and 10 below, the evidence is that somewhat more durable anchoring is afforded by thermosetting resins as a class, possibly because the transformation of these resins into high molecular weight hydrophobic gel form which occurs as they dry inhibits their migration. Of the resins tried, the polyazaalkanes such as polyethylenimine and cationic resins formed by reaction of urea-formaldehyde and a lower polyalkylenepolyamine such as polymer No. 2 below are preferred since these are easily prepared from readily available raw materials, have a mild odor, and do not hydrophobe when stored at room temperature for long periods of time in dilute form in the substantially neutral range of pH 6–8.

From the foregoing, it is evident that any normally hydrophilic organic nitrogenous polymer may be used. The particular polymers found useful are thus not primary features of the invention.

The polymers referred to are normally prepared in the form of high solids syrups. These may be prepared for use by dilution with water or one or more volatile organic liquids. Mixed diluents may be used including aqueous methanol. If desired, dispersions may be prepared in anhydrous form by known means.

The dilute dispersions thus obtained may contain a perfume to mask the slight formaldehyde odor sometimes present; a colorant to render the normally colorless or slightly hazy dispersion more attractive or to tint the keratinous surface; a wetting agent to facilitate contact of the surface therewith; in the case of aqueous dispersions a water-soluble volatile organic liquid such as methanol, acetone, etc. to facilitate drying; and a stabilizer to inhibit premature polymerization of the resin. The presence of such supplementary materials are not primary features of the invention.

As finishing agents there may be advantageously employed any of the organic hydrophobic materials heretofore employed to provide fingernails with a lustrous film. Suitable materials for this purpose include lacquers based on nitrocellulose, shellac, vinyl polymers or hydrogenated rosin or rosin ester. The lacquers customarily contain a plasticizer and a dye or pigment. Finishing agents which may also be applied include emulsified film-forming compositions, thermoplastic resins in the form of hot melt compositions, and waxes. The particular finishing agent employed and the particular manner of its application are not primary features of the invention.

The invention will be more particularly described in the examples which follow. These examples represent specific embodiments of the resins and are not to be contrued as limitations thereon.

POLYMERS EMPLOYED

*No. 1.—Methylol-carbamyl-polyazaalkane resin.*—This resin was prepared by refluxing 131.2 g. of 3,3'-iminobispropylamine with 87.5 g. of 1,2-dichloroethane and 50 cc. of water for two hours to form a polyazaalkane of maximum practical chain length. 200 cc. of water was added. 156 g. of the resulting resinous syrup was neutralized with 37% hydrochloric acid and reacted with 84 g. of potassium cyanate at 75° C. to introduce carbamyl groups. To this condensate was added 162 g. of 37% aqueous formaldehyde and the mixture reacted for 15 minutes at 68° C.

*No. 2.—Urea-formaldehyde-triethylenetetramine cationic resin.*—This resin was prepared according to the method of Example 1 of U.S. Patent No. 2,554,475.

*No. 3.—Urea-formaldehyde-bisulfite anionic resin.*— This resin was prepared according to the method of Example 1 (sample 5), of U.S. Patent No. 2,559,578. A similar resin may be made by passing sulfur dioxide gas through aqueous dimethylolurea solution and then neutralizing; cf. Example 1 of U.S. Patent No. 2,407,376.

*No. 4.—Melamine-formaldehyde acid colloid.*—This resin was prepared by mixing 220 gm. of water, 480 gm. of glycerol, and 71 gm. of 85% lactic acid, after which 100 gm. of the spray-dried melamine-formaldehyde resin of U.S. Patent No. 2,345,543 was added with vigorous stirring until dissolved. The bath was aged 18 hours before use.

*No. 5.*—Methylated melamine resin prepared according to Example 1 of U.S. Patent No. 2,715,619.

*No. 6.—Quaternized triazine.*—This compound was made by quaternizing 2-amino-6-chloromethyl-4-phenyl-s-triazine with trimethylamine and forming the trimethylol derivative by reacting the quaternary salt thus formed with 37% formalin.

*No. 7.—Melamine-formaldehyde-iminobispropylamine resin.*—This resin was prepared by reacting 252 gm. melamine, 1620 gm. of 37% formaldehyde and 4 gm. of triethanolamine at 75° C. for 30 minutes, cooling to 65° C., adding 120 gm. of 3,3'-iminobispropylamine and 90 gm. of 37.5% aqueous HCl, maintaining the reaction at 70° C. by cooling, and stabilizing the mixture by adding 50 gm. of sodium hydroxide and 1300 parts of 37% formaldehyde when the viscosity of the reaction mixture reached I (Gardner-Holdt). The product contained 27% solids.

*No. 8.*—Polyethylenimine, prepared by homopolymerizing ethylenimine to high molecular weight and sold under the name "Polmin P." A suitable material may be prepared by carefully heating monomeric ethylenimine, propylenimine, or butylenimine, or mixtures thereof in the presence of a catalyst, until polymerization has proceeded sufficiently far to form a resin which is hydrophilic and cationic but insufficiently far to render the resin hydrophobic. The end point may readily be found by testing the resin for these properties against paper pulp or by determining the viscosity of the resin as the self-condensation proceeds. A suitable resin has a viscosity of 60–120 seconds, measured by the fall time of a 3 mm. steel ball through 20 mm. of a 50% aqueous solution of the polymer at 20° C.

*No. 9.*—Epichlorohydrin-tetraethylene pentamine polymer prepared according to the procedure of Example 3 of Daniel et al., U.S. Patent No. 2,601,597. The molecular weight of these resins was in excess of 500.

*No. 10.*—10.0 gm. (0.066 mol) of a polymerized p-chloromethyl styrene having a molecular weight of 85,000 (based on viscosity measurements) was dissolved in 190 gm. of dioxane and 18.0 gm. of trimethylamine added as a 25% aqueous solution (0.075 mol). The mixture was stirred for 12 hours at room temperature. The product was recovered by vacuum drying and analyzed N 3.5%, Cl 7.4%. It contained about 17 quaternary groups per 100 linear chain carbon atoms. It easily dispersed in water forming a hazy colloidal cationic dispersion therein.

All resin solutions were adjusted to the specified resin solid contents by addition of water. In dilute form they were usually faintly hazy liquids having no noticeable adhesive properties.

*Example 1*

The increased affinity of keratinous material carrying a small amount of anchor agent for topcoat material is illustrated by the following.

The fingernails of a housewife who habitually washed family dishes were degreased by washing with turpentine after which the nails of one hand were swabbed with a 0.5% solution of polymer No. 7 and the nails of the other hand were swabbed with water. The nails were allowed to dry and were then coated with a commercial red nail lacquer. The lacquer was a pigmented plasticized nitrocellulose lacquer containing acetone and lower alkyl esters as solvents.

The lacquer was allowed to dry for one hour after which the subject resumed her duties which included washing dishes. After four days the lacquer on the right hand (control) fingernails had chipped in several places along the cuticle, and had chipped very extensively along the edges, the width of the chipped areas being about 1/16", rendering the nails unattractive. The lacquer on the left hand (treated) fingernails, however, had a total of only three small and inconspicuous chips and thus was nearly in its original condition.

The foregoing suggests that similar substrates such as leather, horn, parchment and casein display increased affinity for topcoat material when carrying anchoring agent according to the present invention.

*Example 2*

The effectiveness of polymers 1–10 as anchor agents was determined in experiments using housewives who habitually wash family dishes.

In each instance the subject's fingernails were degreased with carbon tetrachloride and the nails of the most used hand swabbed several times with cotton wool saturated with one of the resin solutions listed above. The nails of the other hand were swabbed in the same way with water. The nails were allowed then to dry for about 20 minutes. When dry, the treated nails were non-tacky and indistinguishable by eye from the nails which had not been treated. All nails were then lacquered in the usual way with a fingernail lacquer similar to that of Example 1.

The fingernails were inspected every day for three days. At the end of that time the lacquer on the fingernails which had not been treated with anchor polymer was extensively chipped, whereas the lacquer on the treated fingernails was generally only slightly chipped.

*Example 3*

The procedure of Example 1 was repeated except that the subject was different and polymer No. 8 was applied to the little fingernail, polymer No. 2 to the fourth fingernail, polymer No. 1 to the third fingernail, and polymer No. 9 to the index fingernail of the subject. The thumb nail was treated with polymer No. 7 as before. All nails were dried for about half a minute in a hot air current before and after lacquering. After 48 hours of normal house activity the lacquer on the subject's right hand (untreated) fingernails had failed to the extent where retouching was required. The lacquer on the fingernails of the left hand, however, was perfect. The right hand fingernails were retouched. Seventy-two hours later the lacquer on the right hand fingernails had failed again and was retouched in the same manner while the lacquer on the fingernails of the subject's left hand still remained perfect.

The lacquer on the subject's left hand fingernails was practically perfect (only a few unnoticeable chips) 24 hours later (six days after the commencement of the test), whereas the lacquer on the right hand fingernails had started to fail again.

*Example 4*

The procedure of Example 3 was repeated except that a hard wax (clear automobile wax) was used in place of the lacquer, and the fingernails were buffed to a lustrous finish after application of the wax. Retention of lustre was better on the nails which carried the anchor resin than on the untreated nails.

I claim:
1. Process for forming a lustrous finish of improved durability on smooth keratinous material which comprises wetting the surface of said keratinous material with a fluid dispersion consisting essentially of between about 0.01% and 5% by weight of a water-dispersible hydrophilic ionic organic nitrogenous polymer in a liquid diluent therefor as an anchoring agent, and then coating said keratinous material with a lustrous hydrophobic organic film.
2. A process according to claim 1 wherein the polymer is polymerized ethylenimine.
3. A process according to claim 1 wherein the film-forming material is a nitrocellulose lacquer.
4. A process according to claim 1 wherein the keratinous material is flushed with water after treatment with said polymer to remove any excess thereof present.
5. A process according to claim 1 wherein the dispersion is an aqueous dispersion.
6. A process according to claim 5 wherein the keratinous surface is a fingernail.
7. A process according to claim 6 wherein the polymer is a thermosetting polymer.
8. A process according to claim 7 wherein the fingernail is dried after application of the polymer and before application of the organic film-forming material whereby the polymer is converted to hydrophobic form.
9. A process for polishing a fingernail which comprises swabbing said fingernail with an aqueous dispersion consisting essentially of between about 0.1% and 1% of a cationic hydrophilic organic nitrogenous polymer thereby impregnating the surface of said fingernail with said polymer, drying said nails, applying fingernail lacquer thereto, and drying said lacquer on said nails.
10. A process according to claim 9 wherein the polymer is a thermosetting polymer.

References Cited in the file of this patent

UNITED STATES PATENTS

| | | |
|---|---|---|
| 2,215,898 | Anderson | Sept. 24, 1940 |
| 2,764,168 | Herz | Sept. 25, 1956 |

FOREIGN PATENTS

| | | |
|---|---|---|
| 681,520 | Germany | Sept. 25, 1939 |
| 810,395 | France | Dec. 28, 1936 |

OTHER REFERENCES

Dorland: The Amer. Illustrated Med. Dictionary, W. B. Saunders Co., 1947, 21st ed., pp. 503, 759, 1338.

Sulzberger: J. of Investigative Dermatology, vol. 11, July 1948, pp. 67–72.

The Am. Perf. and Ess. Oil Rev., August 1951, p. 107.

Soap, Perf. and Cos., October 1950, pp. 1014–6.

Drug and Cos. Ind., March 1949, pp. 298–9, 384–5.

Kurzes Handbuch der Polymerisations—Technik, Franz Krczil, Leipzig, 1944, p. 492.